United States Patent [19]
Murata et al.

[11] Patent Number: 6,155,505
[45] Date of Patent: *Dec. 5, 2000

[54] METHOD OF PRODUCING A SUSPENDING AGENT-CONTAINING SLURRY FOR SUSPENSION POLYMERIZATION

[75] Inventors: Mitsushi Murata; Tsunenori Takahashi; Yukio Kato, all of Mie, Japan

[73] Assignee: Mitsubishi Chemical BASF Company Limited, Yokkaichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/850,699

[22] Filed: May 2, 1997

Related U.S. Application Data

[62] Division of application No. 08/609,614, Mar. 1, 1996, Pat. No. 5,889,285.

[30] Foreign Application Priority Data

Mar. 14, 1995 [JP] Japan .................................. 7-054555

[51] Int. Cl.⁷ .................................................. B02C 17/00
[52] U.S. Cl. ................................................................ 241/21
[58] Field of Search .................................. 241/21

[56] References Cited

U.S. PATENT DOCUMENTS

| | | | |
|---|---|---|---|
| 5,320,284 | 6/1994 | Nishida | ................................ 241/21 |
| 5,651,505 | 7/1997 | Lidstrom . | |
| 5,657,931 | 8/1997 | Nair . | |

*Primary Examiner*—Christopher Henderson
*Attorney, Agent, or Firm*—Oblon, Spivak, McClelland, Maier & Neustadt, P.C.

[57] ABSTRACT

A suspending agent-containing slurry is disclosed which comprises a dispersant and a particulate suspending agent having a particle size distribution in which the particle diameter at weight-cumulative 95%, from the minimum particle size, is 1 μm or smaller. A method for efficiently producing the suspending agent-containing slurry is also disclosed. A process for suspension polymerization by use of the suspending agent-containing slurry is further disclosed. The slurry not only has such an excellent suspending ability in suspension polymerization that it enables the production of vinyl polymer beads having a narrow bead size distribution, but also is capable of retaining this ability over long and of exhibiting the same ability even when it has a high concentration. The suspension polymerization process enables vinyl polymer beads having a narrow bead size distribution to be produced efficiently due to the use of the slurry.

10 Claims, No Drawings

METHOD OF PRODUCING A SUSPENDING AGENT-CONTAINING SLURRY FOR SUSPENSION POLYMERIZATION

This is a Division, of application Ser. No. 08/609,614 filed on Mar. 1, 1996, now U.S. Pat. No. 5,889,285.

FIELD OF THE INVENTION

The present invention relates to a suspending agent-containing slurry which not only has such an excellent suspending ability in suspension polymerization that it enables the production of vinyl polymer beads having a narrow bead size distribution, but also is capable of retaining this ability over long and of exhibiting the same ability even when it has a high concentration. The present invention also relates to a method for efficiently producing the suspending agent-containing slurry and a suspension polymerization process in which vinyl polymer beads having a narrow bead size distribution can be produced efficiently by use of the suspending agent-containing slurry.

BACKGROUND OF THE INVENTION

Generally employed suspending agents for suspension polymerization are in the form of a slurry comprising water and inorganic suspending agent particles. In most of such suspending agents, the inorganic suspending agent particles have a weight-average particle diameter of about from 2 to 3 $\mu$m and have a particle size distribution in which the particle diameter at weight-cumulative 95%, from the minimum particle size, is about from 20 to 30 $\mu$m.

However, the inorganic suspending agent particles contained in those suspending agent slurries are apt to aggregate into coarse particles with the lapse of time. Use of a suspending agent slurry containing coarse agglomerates of inorganic suspending agent particles in conducting suspension polymerization poses a problem that a polymer is obtained as coarse beads or coagulates. Thus, the conventional suspending agents are less apt to retain their ability over long.

Even when a conventional suspending agent slurry in which the inorganic suspending agent particles have not agglomerated is used to conduct suspension polymerization, there are problems that the polymer beads obtained tend to have a broad bead size distribution, and that an attempt to obtain polymer beads having a given bead diameter range results in a reduced yield.

On the other hand, an attempt has been made to obtain a narrower bead size distribution by adding various salts to an aqueous dispersion medium for use in polymerization or by regulating the hydrogen ion concentration of an aqueous dispersion medium at the initial stage of polymerization. However, use of these techniques poses a problem that the suspending agent particles, especially when having a small particle diameter, are apt to agglomerate into coarse particles which apparently have a far larger diameter than the primary particles of the suspending agent, whereby the polymer beads finally obtained have an increased bead diameter.

In general, it is preferred to finally obtain polymer beads having a bead diameter around 1 mm in high yield with a smaller suspending agent amount. Attempts are hence being made to reduce the particle diameter of suspending agent particles.

For example, a technique of synthesizing a specific inorganic suspending agent and a technique of grinding an inorganic suspending agent have been proposed (see JP-A-4309504). (The term "JP-A" as used herein means an "unexamined published Japanese patent application.") However, the former technique has a drawback that a special raw material is necessary. The latter technique is capable of yielding inorganic suspending agent particles having a reduced particle size. However, not only the reduced particle size is not sufficiently small, but also the heat generated by friction during grinding is apt to cause an increase in slurry viscosity and thermal agglomeration of suspending agent particles. Consequently, it is difficult with the latter technique to obtain a suspending agent having a desired particle diameter, and the slurry obtained has poor handleability due to its viscosity increase.

To mitigate the above-described problems, the grinding of a suspending agent should be performed in an extremely low suspending agent concentration, i.e., about 10% by weight or below. Although this technique is effective in mitigating the problems concerning the generation of heat in the suspending agent slurry and the viscosity increase caused by thermal agglomeration, industrial use thereof is still disadvantageous because large-scale treatment using this technique requires much time due to the low grinding efficiency thereof.

SUMMARY OF THE INVENTION

The present invention has been achieved in view of the above-described problems of conventional techniques. An object of the present invention is to provide a suspending agent-containing slurry which not only has such an excellent suspending ability in suspension polymerization that it enables the production of vinyl polymer beads having a narrow bead size distribution, but also is capable of retaining this ability over long and of exhibiting the same ability even when it has a high concentration. Another object of the present invention is to provide a method for efficiently producing the suspending agent-containing slurry. Still another object of the present invention is to provide a suspension polymerization process in which vinyl polymer beads having a narrow bead size distribution can be efficiently produced by use of the suspending agent-containing slurry.

As a result of intensive studies made by the present inventors in order to eliminate the problems described above, it has been found that a slurry containing fine particles of an inorganic suspending agent dispersed with the aid of a dispersant has an excellent suspending ability and is capable of retaining this ability over long. The present invention has been achieved based on this finding.

The present invention provides a suspending agent-containing slurry comprising a particulate inorganic suspending agent, a dispersant, and an aqueous medium, said inorganic suspending agent having a particle size distribution in which the particle diameter at weight-cumulative 95%, from the minimum particle size, is 1 $\mu$m or smaller.

The present invention further provides a method of producing the suspending agent-containing slurry which comprises pulverizing a particulate inorganic suspending agent in an aqueous medium in the presence of a dispersant to such a degree that said inorganic suspending agent comes to have a particle size distribution in which the particle diameter at weight-cumulative 95%, from the minimum particle size, is 1 $\mu$m or smaller.

The present invention furthermore provides a process for suspension polymerization which comprises suspension-polymerizing a vinyl monomer in an aqueous medium containing an initiator, a suspending agent, and an anionic surfactant, said suspending agent being one supplied by using the above-described suspending agent-containing slurry in an amount of from 0.01 to 10 parts by weight on a solid basis in terms of the amount of the particulate inorganic suspending agent contained therein per 100 parts by weight of said monomer present in the suspension polymerization system.

DETAILED DESCRIPTION OF THE INVENTION

The suspending agent-containing slurry of the present invention comprises a particulate inorganic suspending agent, a dispersant and an aqueous medium.

Examples of the inorganic suspending agent for use in the present invention include aluminum hydroxide, ferric hydroxide, titanium hydroxide, the phosphates, carbonates, and sulfates of calcium, magnesium, and barium, and slightly water-soluble inorganic compounds such as talc, kaolin, and bentonite. Of these, phosphates such as tricalcium phosphate (hydroxy apatite) and magnesium pyrophosphate are preferred. In particular, a combination of a phosphate, e.g., tricalcium phosphate (hydroxy apatite) or magnesium pyrophosphate, and an anionic surfactant which will be described later is preferred, because a system containing this combination is capable of yielding polymer beads having an extremely narrow bead size distribution.

The particulate inorganic suspending agent should have a particle size distribution in which the particle diameter at weight-cumulative 95%, from the minimum particle size (hereinafter often referred to as d95), is 1 µm or smaller, preferably 0.5 µm or smaller.

If the d95 thereof exceeds 1 µm, this poses a problem that the polymer beads obtained by suspension polymerization have a broad bead size distribution.

The particulate inorganic suspending agent has a weight-average particle diameter, which is an index to particle diameter, of preferably 0.4 µm or smaller, more preferably 0.3 µm or smaller. This is because such fine suspending agent particles not only enable the polymer beads obtained by suspension polymerization to have a narrow bead size distribution, but also are advantageous in that a small amount of the particulate inorganic suspending agent is sufficient for obtaining polymer beads having the desired bead diameter.

The dispersant contained in the slurry is at least one member selected from the group consisting of an inorganic dispersant, a polymeric dispersant and a surfactant.

Examples of the inorganic dispersant include alkali metal or ammonium salts of linear condensed phosphoric acids, e.g., pyrophosphoric acid, tripolyphosphoric acid, and tetrapolyphosphoric acid, or of cyclic condensed phosphoric acids, e.g., trimetaphosphoric acid, tetrametaphosphoric acid, pentametaphosphoric acid, hexametaphosphoric acid, and octametaphosphoric acid.

Examples of the polymeric dispersant include polymeric dispersants containing a hydroxyl group, an amido group, a carboxyl group, a sulfo group or a phosphono group, or an alkali metal or ammonium salt of a carboxyl, sulfo or phosphono group, which are represented by sodium salts of polymers of acrylic or methacrylic acid or of copolymers of acrylic or methacrylic acid with an alkyl acrylate or an alkyl methacrylate, polyacrylamide, poly(vinyl alcohol), and sodium oligostyrenesulfonate.

Examples of the surfactant include surfactants containing a hydroxyl group, an amido group, a carboxyl group, a sulfo group or a phosphono group, or an alkali metal or ammonium salt of a carboxyl, sulfo or phosphono group, and ether-type surfactants, which are represented by sodium alkylphosphonates, sodium salts of aromatic sulfonic acid/formalin condensates, sodium alkylsulfates, polyoxyethylene alkylphenyl ethers, lauryltrimethylammonium chloride, and diethanol amide of fatty acid.

In the suspending agent-containing slurry of the present invention, the dispersant is present in an amount of preferably from 0.01 to 10 parts by weight, more preferably from 0.1 to 5 parts by weight, per 100 parts by weight of the inorganic suspending agent. If the amount of the dispersant is too small, it is difficult to maintain the ability of the suspending agent-containing slurry over long. On the other hand, too large amounts thereof are apt to pose a problem that unstable droplets are formed during suspension polymerization, resulting in coarse polymer beads or coagulates of polymer beads.

Examples of the aqueous medium contained in the suspending agent-containing slurry of the present invention include water and alcohol such as methyl alcohol, ethyl alcohol and propyl alcohol. Especially preferred of these is water.

The solid concentration (i.e., the concentration of the particulate inorganic suspending agent) in the suspending agent-containing slurry of the present invention can be regulated to a desired value in a wide range up to a high value, for example in the range of preferably from 0.05 to 50% by weight, more preferably from 20 to 40% by weight.

Too low solid concentrations are industrially disadvantageous in that pulverization efficiency, i.e., the amount of suspending agent particles produced per unit time with a pulverizer, in the slurry production described later is low and much time is necessary for obtaining a suspending agent having a desired particle size, and that the transportation and storage of the slurry are costly and require much labor. Too high solid concentrations pose a problem that the suspending agent slurry obtained has an increased viscosity and hence poor handleability.

One method for preparing the suspending agent-containing slurry of the present invention comprises pulverizing a particulate inorganic suspending agent in an aqueous medium in the presence of a dispersant to such a degree that the suspending agent comes to have a d95 of 1 µm or smaller.

The particulate inorganic suspending agent and the dispersant for use in this method are respectively the same as those described hereinabove. The amount of the dispersant present in the slurry is preferably from 0.01 to 10 parts by weight, more preferably from 0.1 to 5 parts by weight, per 100 parts by weight of the particulate inorganic suspending agent. If the amount of the dispersant is too small, not only pulverization efficiency is low, making it difficult to complete pulverization in a short time period and to obtain a suspending agent with a desired particle diameter, but also the suspending agent slurry prepared tends to have an increased viscosity and poor handleability. As a result, the concentration of the particulate inorganic suspending agent in the slurry obtained should necessarily be reduced, so that the advantages brought about by a high concentration in the suspending agent-containing slurry cannot be obtained. Too large amounts thereof are undesirable in that during the suspension polymerization which will be described later, the normal dispersed state of a vinyl monomer in an aqueous dispersion medium cannot be maintained, so that polymer beads having a too large bead diameter are yielded and, in some cases, coagulation occurs during the polymerization reaction.

For pulverizing a particulate inorganic suspending agent, various pulverizing or agitating apparatus may be used, such as a high-shear agitator, an ultrasonic pulverizer, a hammer crusher and a medium-agitating mill. These apparatus may be used alone or in combination of two or more thereof.

In the present invention, the particle size and distribution of fine inorganic particles in a suspending agent-containing slurry are determined before and after pulverization by diluting 0.3 g of the slurry with 100 g of deionized water to regulate the concentration thereof and immediately thereafter analyzing the diluted slurry with a particle size distribution analyzer based on the dynamic light-scattering method.

However, a sample which contained coarse particles, such as over 6 µm, that was not able to determine the particle size by using dynamic light-scattering method (upper limit was about 6 µm), the particle size and distribution of the sample were determined by means of a laser diffraction type particle size analyzer (measuring range was from 0.5 µm to 1.7 mm). And these samples were diluted in deionized water, to a concentration about 0.05% by weight, then analyzed by the laser diffraction type particle size analyzer with stirring.

The suspension polymerization process of the present invention comprises preparing an aqueous medium containing a vinyl monomer, an initiator, an anionic surfactant and the suspending agent-containing slurry of the present invention and heating the system with stirring to polymerize the monomer.

Examples of the vinyl monomer for use in the suspension polymerization process of the present invention include vinylaromatic compounds such as styrene, α-methylstyrene, vinyltoluene, p-methylstyrene, p-ethylstyrene, sodium styrenesulfonate, and chlorostyrene. Such vinylaromatic compounds may be used in combination with acrylic vinyl compounds, e.g., acrylic acid, methyl acrylate, ethyl acrylate, propyl acrylate, butyl acrylate, and 2ethylhexyl acrylate; methacrylic vinyl compounds, e.g., methacrylic acid, methyl methacrylate, ethyl methacrylate, propyl methacrylate, butyl methacrylate, and 2-ethylhexyl methacrylate; crosslinking bifunctional vinyl compounds, e.g., acrylonitrile, divinylbenzene, ethylene glycol dimethacrylate, butadiene, and isoprene; and other various vinyl compounds including glycidyl acrylate and glycidyl methacrylate.

Examples of the initiator for use in the suspension polymerization process of the present invention include monomer-soluble initiators such as azo compounds, e.g., azobisisobutyronitrile, cumene hydroperoxide, dicumyl peroxide, t-butyl peroxy-2-ethylhexanoate, t-butyl peroxybenzoate, 1,1-di-t-butylperoxy-2-methylcyclohexane, benzoyl peroxide, t-butyl peroxyisopropyl carbonate, t-butyl peroxy-2-ethylhexyl monocarbonate, and lauroyl peroxide. In general, the initiator is used in an amount of preferably from 0.01 to 3 parts by weight per 100 parts by weight of the total amount of all monomer introduced.

In the suspension polymerization of the present invention, the suspending agent-containing slurry of this invention is used in an amount of generally from 0.01 to 10 parts by weight, preferably from 0.05 to 1 part by weight, on a solid bases in terms of the amount of the particulate inorganic suspending agent per 100 parts by weight of the monomer present in the suspension polymerization system.

Various electrolytes can be added during the polymerization according to the present invention for the purpose of regulating particle size or distribution, inhibiting polymer deposition within the reactor, or inhibiting the formation of an emulsified polymer.

The electrolytes are substances which, when dissolved in water, dissociate into ions. Examples thereof include inorganic salts such as lithium chloride, sodium chloride, magnesium chloride, potassium chloride, calcium chloride, aluminum chloride, ammonium chloride, sodium sulfate, magnesium sulfate, potassium sulfate, aluminum sulfate, ammonium sulfate, sodium nitrate, magnesium nitrate, potassium nitrate, calcium nitrate, sodium carbonate, magnesium carbonate, potassium carbonate, calcium carbonate, ammonium carbonate, sodium hydroxide, magnesium hydroxide, calcium hydroxide, and potassium hydroxide; and water-soluble alkali metal carboxylates such as potassium acetate, sodium acetate, sodium octanoate, sodium benzoate, disodium succinate, magnesium succinate, dipotassium succinate, disodium oxalate, magnesium oxalate, dipotassium oxalate, sodium citrate, magnesium citrate, and dipotassium citrate. These electrolytes are added in the form of powder, granules, or aqueous solution at the beginning of or during polymerization.

The amount of the electrolyte added to the aqueous medium is preferably from 0.001 to 5.0 parts by weight per 100 parts by weight of the aqueous medium.

Surfactants, e.g., a sodium α-olefinsulfonate, sodium dodecylbenzenesulfonate, and a sodium (alkyldiphenyl ether)disulfonate, various reactive surfactants, and the like may be preferably used in the suspension polymerization process of the present invention for the purpose of regulating the interfacial tension between the vinyl monomer and the aqueous medium. Especially preferred surfactants are anionic surfactants such as alkali metal alkylsufonates having 8 to 20 carbon atoms, because these surfactants are effective in stably dispersing monomer droplets during suspension polymerization. The amount thereof is preferably from 0.0001 to 0.5 parts by weight per 100 parts by weight of the aqueous medium.

In the suspension polymerization process of the present invention, a chain-transfer agent such as an alkyl mercaptan, e.g., dodecyl mercaptan, α-methylstyrene dimer, or the like may be added as a molecular weight regulator to the polymerization reaction system if desired and necessary. This chain-transfer agent is preferably used in an amount of usually from 0.01 to 3 parts by weight per 100 parts by weight of all monomer to be polymerized.

If desired and necessary, a plasticizer such as a phthalic ester, e.g., dioctyl phthalate, or a fatty acid ester; an organic compound such as toluene, xylene, or cyclohexane; or the like may be added to the polymerization reaction system in the suspension polymerization process of the present invention.

The suspension polymerization process of the present invention can be applied to a process for producing expandable polymer beads in which process a blowing agent is added during or after the suspension polymerization according to the present invention to impregnate the blowing agent into polymer beads. Examples of the blowing agent include physical blowing agents such as aliphatic hydrocarbons, e.g., propane, n-butane, isobutane, n-pentane, isopentane, neobutane and hexane, alicyclic hydrocarbons, e.g., cyclobutane and cyclopentane, halogenated hydrocarbons, e.g., methyl chloride and dichlorofluoromethane; and chemical blowing agents generating carbon dioxide, nitrogen, ammonia or the like. These blowing agents may be used alone or in combination of two or more thereof. The blowing agent is fed usually in such an amount that the polymer beads yielded have a blowing agent content of about from 1 to 20% by weight. A nucleating agent such as ethylenebisstearamide, methylenebisstearamide, an ethylene-vinyl acetate copolymer resin, or the like may be added beforehand to the vinyl monomer for use in producing such expandable polymer beads.

Further, various additives generally used in the production of expandable polymer beads may be suitably added. Examples of such additives include a flame retardant, a flame retardant synergist, an antistatic agent, a conductivity-imparting agent, and a bead size distribution regulator. It is also possible to mix a rubber ingredient, e.g., a butadiene rubber or a styrene-butadiene rubber.

For adding a monomer to an aqueous medium, use may be made of a method in which the monomer is fed into a reactor at a time beforehand or a method in which polymerization is conducted while gradually adding the monomer. The feed amount of the vinyl monomer is usually from 5 to 150 parts by weight per 100 parts by weight of the aqueous medium, although it is suitably regulated-according to the desired bead diameter of the polymer beads to be produced, etc.

In a representative embodiment of the suspension polymerization according to the present invention, an anionic surfactant, an initiator, a vinyl monomer, and other optional ingredients are added to an aqueous medium containing the suspending agent-containing slurry produced beforehand, and oxygen is removed from the reaction system, following which suspension polymerization is conducted with stirring at a given temperature for a given time period.

The present invention will be explained below in more detail by reference to Examples and Comparative Examples, but the invention should not be construed as being limited thereto.

EXAMPLE 1

(Preparation of Suspending Agent-Containing Slurry)

In 1,500 g of deionized water was dissolved 10 g of sodium tripolyphosphate. Thereto was added 500 g of powdery tricalcium phosphate (manufactured by Taihei Chemical Industrial Co., Ltd., Japan). This mixture was treated with a medium-agitating mill (manufactured by Kotobuki Eng. & Mfg. Co., Ltd., Japan) with circulation for 15 minutes. The d95 and weight-average particle diameter of the pulverized particles were determined with a particle size analyzer of the dynamic light-scattering type (manufactured by Otsuka Denshi K.K., Japan), and were found to be 0.46 μm and 0.19 μm, respectively. (Solid concentration in the slurry, 25% by weight)

(Suspension Polymerization)

Into a 50-liter autoclave equipped with a stirrer were introduced 20 liters of deionized water, 80 g of the suspending agent-containing slurry prepared above (suspending agent content on a solid basis during polymerization, 0.1% by weight), and 0.8 g of sodium dodecylbenzenesulfonate. Thereto was then added, with stirring, a solution prepared by dissolving 45 g of t-butyl peroxy-2-ethylhexanoate, 27 g of 1,1-bis(t-butylperoxy)-3,3,5-trimethylcyclohexane, and 270 g of cyclohexane as a plasticizer into 18 kg of styrene monomer.

After the resulting mixture was stirred at room temperature for 30 minutes, it was heated to 90° C. over a period of 1 hour. The mixture was then heated from 90° C. to 100° C. over a period of 5.5 hours, during which 1.7 kg of butane was added into the autoclave at 4 hours after the arrival at 90° C. The reaction mixture was further heated from 100° C. to 110° C. over a period of 1.5 hours, and then maintained at this temperature for another 2 hours.

Subsequently, the reaction mixture was cooled to room temperature, and a polymer bead slurry was taken out with stirring. After hydrochloric acid was added to dissolve the suspending agent, the polymer bead slurry was examined for the bead size distribution of the polymer beads with a particle size analyzer of the laser diffraction type (manufactured by SYMPATEC, Germany). The polymer beads thus produced had a weight-average bead diameter of 1.06 mm and the bead size distribution thereof had a single peak. This bead size distribution had a dispersion index as defined by the following equation of 0.53, showing that the bead size distribution was narrow.

$$\text{Dispersion index} = (d85 - d15)/d50 \quad (I)$$

In equation (I), d85, d15, and d50 are the bead diameters (mm) at the points where the bead diameter weightcumulation from the minimum bead diameter reaches 85%, 15%, and 50%, respectively, of the total weight.

The term "dispersion index" herein means the degree of dispersion as defined by the above equation (I).

The polymer bead slurry was washed with water and then centrifuged to obtain expandable polymer beads. These polymer beads were dried with a fluidized-bed dryer to remove the adherent surface water and then expanded with a pre-expander (manufactured by Daisen Industry Co. Ltd., Japan). As a result, the polymer beads were expanded to a bulk density of 15 g/l. The pre-expanded polymer beads were subjected to molding with a molding machine (manufactured by Daisen Industry Co. Ltd.). As a result, a molded article uniform in the size of expanded beads and satisfactory in appearance was obtained.

On the other hand, the suspending agent-containing slurry obtained above through pulverization of a suspending agent was allowed to stand at 40° C. for 2 weeks. The suspending agent particles after the standing had a d95 of 0.49 μm and a weight-average particle diameter of 0.21 μm. This suspending agent-containing slurry was used to conduct polymerization in the same manner as the above. The polymer beads obtained by this suspension polymerization had a weight-average bead diameter of 1.10 mm and a bead size distribution with a single peak. The dispersion index thereof was 0.57, showing that the bead size distribution was narrow. Thus, the suspending agent-containing slurry showed extremely little change in suspending ability with the lapse of time.

EXAMPLE 2

Tricalcium phosphate was pulverized in the same manner as in Example 1, except that sodium hexametaphosphate was used as a dispersant. The d95 and weight-average particle diameter of the pulverized suspending agent particles were 0.44 μm and 0.18 μm, respectively.

Polymerization was then carried out in the same manner as in Example 1, except that the suspending agent-containing slurry prepared above was used (suspending agent content on a solid basis during polymerization, 0.1% by weight). The polymer beads obtained by this suspension polymerization had a weight-average bead diameter of 1.06 mm and a bead size distribution with a single peak. The dispersion index thereof was 0.55, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.47 μm and a weight-average particle diameter of 0.19 μm. This suspending agent-containing slurry was used to conduct polymerization in the same manner as the above. The polymer beads obtained by this suspension polymerization had a weight-average bead diameter of 1.08 mm and a bead size distribution with a single peak. The dispersion index thereof was 0.57, showing that the bead size distribution was narrow. Thus, the suspending agent-containing slurry showed extremely little change in suspending ability with the lapse of time.

EXAMPLE 3

Tricalcium phosphate was pulverized in the same manner as in Example 1, except that 5 g of an aqueous poly(sodium acrylate) solution having an active-principle content of 40% (trade name, Nopcosperse 44C; manufactured by San Nopco Limited, Japan) was used as a dispersant. The d95 and weight-average particle diameter of the pulverized suspending agent particles were 0.45 $\mu$m and 0.19 $\mu$m, respectively.

Polymerization was then carried out in the same manner as in Example 1, except that the suspending agent-containing slurry prepared above was used (suspending agent content on a solid basis during polymerization, 0.1% by weight). The polymer beads obtained by this suspension polymerization had a weight-average bead diameter of 1.08 mm and a bead size distribution with a single peak. The dispersion index thereof was 0.56, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.46 $\mu$m and a weight-average particle diameter of 0.20 $\mu$m. This suspending agent-containing slurry was used to conduct polymerization in the same manner as the above. The polymer beads obtained by this suspension polymerization had a weight-average bead diameter of 1.10 mm and a bead size distribution with a single peak. The dispersion index thereof was 0.57, showing that the bead size distribution was narrow. Thus, the suspending agent-containing slurry showed extremely little change in suspending ability with the lapse of time.

EXAMPLE 4

Tricalcium phosphate was pulverized in the same manner as in Example 1, except that 10 g of an aqueous organic-phosphonate solution having an active-principle content of 50% (trade name, Hydropalate 884; manufactured by Henkel KGaA) was used as a dispersant. The d95 and weight-average particle diameter of the pulverized suspending agent particles were 0.44 $\mu$m and 0.18 $\mu$m, respectively.

Polymerization was then carried out in the same manner as in Example 1, except that the suspending agent-containing slurry prepared above was used (suspending agent content on a solid basis during polymerization, 0.1% by weight). The polymer beads obtained by this suspension polymerization had a weight-average bead diameter of 1.06 mm and a bead size distribution with a single peak. The dispersion index thereof was 0.55, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.45 $\mu$m and a weight-average particle diameter of 0.19 $\mu$m. This suspending agent-containing slurry was used to conduct polymerization in the same manner as the above. The polymer beads obtained by this suspension polymerization had a weight-average bead diameter of 1.08 mm and a bead size distribution with a single peak. The dispersion index thereof was 0.56, showing that the bead size distribution was narrow. Thus, the suspending agent-containing slurry showed extremely little change in suspending ability with the lapse of time.

EXAMPLE 5

Tricalcium phosphate was pulverized in the same manner as in Example 1, except that 10 g of a powdery sodium salt of β-naphthalenesulfonic acid/formalin condensate (trade name, Demol N; manufactured by Kao Corp., Japan) was used as a dispersant. The d95 and weight-average particle diameter of the pulverized suspending agent particles were 0.46 $\mu$m and 0.19 $\mu$m, respectively.

Polymerization was then carried out in the same manner as in Example 1, except that the suspending agent-containing slurry prepared above was used (suspending agent content on a solid basis during polymerization, 0.1% by weight). The polymer beads obtained by this suspension polymerization had a weight-average bead diameter of 1.08 mm and a bead size distribution with a single peak. The dispersion index thereof was 0.57, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.47 $\mu$m and a weight-average particle diameter of 0.19 $\mu$m. This suspending agent-containing slurry was used to conduct polymerization in the same manner as the above. The polymer beads obtained by this suspension polymerization had a weight-average bead diameter of 1.09 mm and a bead size distribution with a single peak. The dispersion index thereof was 0.57, showing that the bead size distribution was narrow. Thus, the suspending agent-containing slurry showed extremely little change in suspending ability with the lapse of time.

EXAMPLE 6

Into a 50-liter autoclave equipped with a stirrer were introduced 19.6 kg of deionized water and 550 g of trisodium phosphate dodecahydrate. The contents were heated to 90° C. Subsequently, 760 g of a 35 wt % aqueous calcium chloride solution was added dropwise thereto with stirring over a period of 30 minutes, and the resulting mixture was then stirred at 90° C. for 1 hour. After this mixture was cooled to room temperature, part of the slurry produced was filtered to measure the concentration in the slurry. As a result, the concentration was found to be 3.9%. The d95 and weight-average particle diameter of the tricalcium phosphate yielded were 13.48 $\mu$m and 4.33 $\mu$m, respectively.

Subsequently, 12.8 kg of the slurry obtained was concentrated by ultrafiltration to 2 kg (inorganic-suspending-agent content on a solid basis, 25% by weight). Therein was dissolved 40 g of an aqueous organic-phosphonate solution having an active-principle content of 50% (trade name, Hydropalate 884; manufactured by Henkel Kgaa) as a dispersant. This mixture was treated with a medium-agitating mill (manufactured by Kotobuki Eng. & Mfg. Co., Ltd.) with circulation for 15 minutes. The d95 and weight-average particle diameter of the pulverized particles were 0.50 $\mu$m and 0.20 $\mu$m, respectively.

Polymerization was carried out in the same manner as in Example 1, except that the suspending agent-containing slurry prepared above was used in an amount of 80 g (suspending agent content on a solid basis during polymerization, 0.1% by weight). The polymer beads obtained by this suspension polymerization had a weight-average bead diameter of 1.15 mm and a bead size distribution with a single peak. The dispersion index thereof was 0.57, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.51 μm and a weight-average particle diameter of 0.21 μm. This suspending agent-containing slurry was used to conduct polymerization in the same manner as the above. The polymer beads obtained by this suspension polymerization had a weight-average bead diameter of 1.18 mm and a bead size distribution with a single peak. The dispersion index thereof was 0.58, showing that the bead size distribution was narrow. Thus, the suspending agent-containing slurry showed extremely little change in suspending ability with the lapse of time.

EXAMPLE 7

Into a 50-liter autoclave equipped with a stirrer were introduced 27 kg of deionized water and 500 g of sodium pyrophosphate. Subsequently, 2 kg of a 50 wt % aqueous magnesium sulfate solution was added dropwise thereto with stirring over a period of 30 minutes, and the resulting mixture was then stirred at room temperature for 1 hour. Part of the slurry produced was filtered to measure the concentration in the slurry. As a result, the concentration was found to be 1.5%. The d95 and weight-average particle diameter of the magnesium pyrophosphate yielded were 22.75 μm and 7.21 μm, respectively.

Subsequently, 26.7 kg of the slurry obtained was concentrated by ultrafiltration to 2 kg (inorganic-suspending-agent content on a solid basis, 20% by weight). Therein was dissolved 40 g of an aqueous poly(sodium acrylate) solution having an active-principle content of 40% (trade name, Nopcosperse 44C; manufactured by San Nopco Limited) as a dispersant. This mixture was treated with a medium-agitating mill (manufactured by Kotobuki Eng. & Mfg. Co., Ltd.) with circulation for 15 minutes. The d95 and weight-average particle diameter of the pulverized particles were 0.38 μm and 0.17 μm, respectively.

Polymerization was carried out in the same manner as in Example 1, except that the suspending agent-containing slurry prepared above was used in an amount of 50 g (suspending agent content on a solid basis during polymerization, 0.05% by weight). The polymer beads obtained by this suspension polymerization had a weight-average bead diameter of 0.99 mm and a bead size distribution with a single peak. The dispersion index thereof was 0.57, showing that the bead size distribution was narrow.

Subsequently, the suspending agent-containing slurry obtained above through pulverization of a suspending agent was allowed to stand at 40° C. for 2 weeks. The suspending agent particles after the standing had a d95 of 0.46 μm and a weight-average particle diameter of 0.20 μm. This suspending agent-containing slurry was used to conduct polymerization in the same manner as the above. The polymer beads obtained by this suspension polymerization had a weight-average bead diameter of 1.05 mm and a bead size distribution with a single peak. The dispersion index thereof was 0.59, showing that the bead size distribution was narrow. Thus, the suspending agent-containing slurry showed extremely little change in suspending ability with the lapse of time.

EXAMPLE 8

In 667 g of a magnesium pyrophosphate slurry prepared in the same manner as in Example 7 was dissolved 2.5 g of an aqueous poly(sodium acrylate) solution having an active-principle content of 40% (trade name, Nopcosperse 44C; manufactured by San Nopco Limited) as a dispersant. This mixture was treated with a medium-agitating mill (manufactured by Kotobuki Eng. & Mfg. Co., Ltd.) with circulation for 5 minutes. The d95 and weight-average particle diameter of the pulverized suspending agent particles were 0.90 μm and 0.51 μm, respectively.

Polymerization was then carried out in the same manner as in Example 1, except that the suspending agent-containing slurry prepared above was used in an amount of 667 g (suspending agent content on a solid basis during polymerization, 0.05% by weight). The polymer beads thus obtained had a weight-average bead diameter as large as 1.40 mm, but the bead size distribution thereof had a single peak. The dispersion index thereof was 0.57, showing that the bead size distribution was narrow.

On the other hand, the suspending agent-containing slurry obtained above through pulverization of a suspending agent was allowed to stand at 40° C. for 2 weeks. The suspending agent particles after the standing had a d95 of 0.91 μm and a weight-average particle diameter of 0.53 μm. This suspending agent-containing slurry was used in an amount of 667 g (suspending agent content on a solid basis during polymerization, 0.05% by weight) to conduct polymerization in the same manner as the above. The polymer beads thus obtained had a weight-average bead diameter of 1.44 mm, which was larger than the weight-average bead diameter of the polymer beads produced with the suspending agent just after pulverization. However, the bead size distribution had a single peak. The dispersion index thereof was 0.58, showing that the bead size distribution was narrow. Thus, the suspending agent-containing slurry showed extremely little change in suspending ability with the lapse of time.

TABLE 1

| No. | Fine inorganic particles | Dispersant | Pulverization | Storage conditions | Particle diameter of inorganic suspending agent | | Content of solid suspending agent during polymerization (μm) | Diameter of polymer beads (μm) | Dispersion index |
|---|---|---|---|---|---|---|---|---|---|
| | | | | | d95 (μm) | Weight-average (μm) | | | |
| Example 1 | Tricalcium phosphate | Sodium tripolyphosphate | Conducted | — | 0.46 | 0.19 | 0.1 | 1.06 | 0.53 |
| | | | | 40° C. × 2 weeks | 0.49 | 0.21 | 0.1 | 1.10 | 0.57 |
| Example 2 | Tricalcium phosphate | Sodium hexametaphosphate | " | — | 0.44 | 0.18 | 0.1 | 1.06 | 0.55 |
| | | | | 40° C. × 2 weeks | 0.47 | 0.19 | 0.1 | 1.08 | 0.57 |
| Example 3 | Tricalcium phosphate | A*1 | " | — | 0.45 | 0.19 | 0.1 | 1.08 | 0.56 |
| | | | | 40° C. × 2 weeks | 0.46 | 0.20 | 0.1 | 1.10 | 0.57 |
| Example 4 | Tricalcium phosphate | B*2 | " | — | 0.44 | 0.18 | 0.1 | 1.06 | 0.55 |
| | | | | 40° C. × 2 weeks | 0.45 | 0.19 | 0.1 | 1.08 | 0.56 |
| Example 5 | Tricalcium phosphate | C*3 | " | — | 0.46 | 0.19 | 0.1 | 1.08 | 0.57 |
| | | | | 40° C. × 2 weeks | 0.47 | 0.19 | 0.1 | 1.09 | 0.57 |
| Example 6 | Tricalcium phosphate | B | " | — | 0.50 | 0.20 | 0.1 | 1.15 | 0.57 |
| | | | | 40° C. × 2 weeks | 0.51 | 0.21 | 0.1 | 1.18 | 0.58 |
| Example 7 | Magnesium pyrophosphate | A | " | — | 0.38 | 0.17 | 0.05 | 0.99 | 0.57 |
| | | | | 40° C. × 2 weeks | 0.46 | 0.20 | 0.05 | 1.05 | 0.59 |
| Example 8 | Magnesium pyrophosphate | A | " | — | 0.90 | 0.51 | 0.05 | 1.40 | 0.57 |
| | | | | 40° C. × 2 weeks | 0.91 | 0.53 | 0.05 | 1.44 | 0.58 |

*1: Aqueous poly(sodium acrylate) solution having an active-principle content of 40%
*2: Aqueous organic-phosphonate solution having an active-principle content of 50%
*3: Sodium salt of β-naphthalenesulfonic acid/formalin condensate

COMPARATIVE EXAMPLE 1

The d95 and weight-average particle diameter of tricalcium phosphate were measured without pulverization, and were found to be 52.7 μm and 7.86 μm, respectively. Polymerization was carried out in the same manner as in Example 1, except that 40 g of this unpulverized tricalcium phosphate was used. The polymer beads thus obtained had a weight-average bead diameter of 1.02 mm and a bead size distribution with a single peak. However, the dispersion index thereof was 0.79, showing that the bead size distribution was considerably broad.

COMPARATIVE EXAMPLE 2

The d95 and weight-average particle diameter of a commercial slurried tricalcium phosphate (trade name, T.C.P10; manufactured by Taihei Chemical Industrial Co., Ltd.) were measured without pulverization, and were found to be 25.4 μm and 2.86 μm, respectively. Polymerization was carried out in the same manner as in Example 1, except that this unpulverized slurried tricalcium phosphate (inorganic-suspending-agent content on a solid basis, 10% by weight) was used in an amount of 400 g (suspending agent content on a solid basis during polymerization, 0.2% by weight). The polymer beads thus obtained had a weight-average bead diameter of 0.98 mm and a bead size distribution with a single peak. However, the dispersion index thereof was 0.82, showing that the bead size distribution was considerably broad. on the other hand, the slurried tricalcium phosphate described above was allowed to stand at 40° C. for 2 weeks. After the standing, the d95 and weight-average particle diameter of the suspending agent particles had increased to 27.3 μm and 2.97 μm, respectively, due to agglomeration. Polymerization was carried out in the same manner as in Example 1, except that this slurried tricalcium phosphate was used in an amount of 400 g (suspending agent content on a solid basis during polymerization, 0.2% by weight). The resulting polymer beads had a weight-average bead diameter of 1.03 mm, which was larger than the weight-average bead diameter of the polymer beads produced with the slurried tricalcium phosphate prior to the standing. Although the bead size distribution thereof had a single peak, the dispersion index thereof was 0.83, showing that the bead size distribution had become broader. Thus, the slurry deteriorated in suspending ability.

COMPARATIVE EXAMPLE 3

Tricalcium phosphate was pulverized in the same oanner as in Example 1, except that a dispersant was not added for the pulverization. The d95 and weight-average particle diameter of the pulverized suspending agent particles were 3.15 μm and 1.13 μm, respectively.

Polymerization was then carried out in the same manner as in Example 1, except that the suspending agentcontaining slurry thus prepared was used in an amount of 80 g (suspending agent content on a solid basis during polymerization, 0.1% by weight). The polymer beads thus obtained had a weight-average bead diameter of 1.27 mm and a bead size distribution with a single peak. However, the dispersion index thereof was 0.64, showing that the bead size distribution was broad.

On the other hand, the suspending agent-containing slurry obtained above through pulverization of a suspending agent was allowed to stand at 40° C. for 2 weeks. After the standing, the d95 and weight-average particle diameter of the suspending agent particles had increased to 4.76 μm and 1.64 μm, respectively, due to agglomeration. Polymerization was carried out in the same manner as the above, except that this suspending agent-containing slurry was used in an amount of 80 g (suspending agent content on a solid basis during polymerization, 0.1% by weight). The resulting polymer beads had a weight-average bead diameter of 1.39 mm, which was larger than the weight-average bead diameter of the polymer beads produced with the suspending agent just after pulverization. Although the bead size distribution thereof had a single peak, the dispersion index thereof was 0.73, showing that the bead size distribution had become broader. Thus, the slurry deteriorated considerably in suspending ability.

COMPARATIVE EXAMPLE 4

Tricalcium phosphate was pulverized in the same manner as in Example 1, except not using a dispersant, not for 15 minutes but for a shorter period of 2 minutes. The d95 and weight-average particle diameter of the pulverized suspending agent particles were 7.83 μm and 2.47 μm, respectively.

Polymerization was then carried out in the same manner as in Example 1, except that the suspending agent-containing slurry thus prepared was used in an amount of 80 g (suspending agent content on a solid basis during polymerization, 0.1% by weight). The polymer beads thus obtained had a weight-average bead diameter as large as 1.70 mm. Although the bead size distribution thereof had a single peak, the dispersion index thereof was 0.76, showing that the bead size distribution was broad.

Subsequently, the suspending agent-containing slurry obtained above through pulverization of a suspending agent was allowed to stand at 40° C. for 2 weeks. After the standing, the d95 and weight-average particle diameter of the suspending agent particles had increased to 18.24 μm and 5.32 μm, respectively, due to agglomeration. Polymerization was carried out in the same manner as the above, except that this suspending agent-containing slurry was used in an amount of 80 g (suspending agent content on a solid basis during polymerization, 0.1% by weight). As a result, coagulation occurred.

COMPARATIVE EXAMPLE 5

Magnesium pyrophosphate was pulverized in the same manner as in Example 1, except not using a dispersant, not for 15 minutes but for a shorter period of 2 minutes. The d95 and weight-average particle diameter of the pulverized suspending agent particles were 7.55 μm and 2.73 μm, respectively.

Polymerization was then carried out in the same manner as in Example 1, except that the suspending agent-containing slurry thus prepared was used in an amount of 667 g (suspending agent content on a solid basis during polymerization, 0.05% by weight). The polymer beads thus obtained had a weight-average bead diameter as large as 1.52 mm. Although the bead size distribution thereof had a single peak, the dispersion index thereof was 0.78, showing that the bead size distribution was broad.

Subsequently, the suspending agent-containing slurry obtained above through pulverization of a suspending agent was allowed to stand at 40° C. for 2 weeks. After the standing, the d95 and weight-average particle diameter of the suspending agent particles had increased to 12.57 μm and 4.82 μm, respectively, due to agglomeration. Polymerization was carried out in the same manner as the above, except that this suspending agent-containing slurry was used in an amount of 667 g (suspending agent content on a solid basis during polymerization, 0.05% by weight). As a result, coagulation occurred.

COMPARATIVE EXAMPLE 6

In 667 g of a slurry obtained in the same manner as in Example 7 was dissolved 2.5 g of an aqueous poly(sodium acrylate) solution having an active-principle content of 40% (trade name, Nopcosperse 44C; manufactured by San Nopco Limited) as a dispersant. This solution was divided into two equal parts. One of these was subjected to ten-minute pulverization treatment, while the other was subjected to 5-minute pulverization treatment. The two parts were then sufficiently mixed with each other to obtain a suspending agent-containing slurry. The d95 and weight-average particle diameter of the pulverized suspending agent particles were 2.05 μm and 0.31 μm, respectively. Polymerization was then carried out in the same manner as in Example 1, except that the suspending agent-containing slurry thus prepared was used in an amount of 667 g (suspending agent content on a solid basis during polymerization, 0.05% by weight). The polymer beads thus obtained had a weight-average bead diameter of 1.21 mm, which was slightly large. Although the bead size distribution thereof had a single peak, the dispersion index thereof was 0.81, showing that the bead size distribution was considerably broad.

Subsequently, the suspending agent-containing slurry obtained above through pulverization of a suspending agent was allowed to stand at 40° C. for 2 weeks. After the standing, the d95 and weight-average particle diameter of the suspending agent particles were 2.13 μm and 0.32 μm, respectively. Polymerization was carried out in the same manner as the above, except that this suspending agent-containing slurry was used in an amount of 667 g (suspending agent content on a solid basis during polymerization, 0.05% by weight). The polymer beads obtained by this suspension polymerization had a weight-average bead diameter as large as 1.32 mm. Although the bead size distribution thereof had a single peak, the dispersion index thereof was 0.83, showing that the bead size distribution was considerably broad. The slurry underwent little deterioration in suspending ability.

TABLE 2

| No. | Fine inorganic particles | Dispersant | Pulverization | Storage conditions | Particle diameter of inorganic suspending agent | | Content of solid suspending agent during polymerization (μm) | Diameter of polymer beads (μm) | Dispersion index |
|---|---|---|---|---|---|---|---|---|---|
| | | | | | d95 (μm) | Weight-average (μm) | | | |
| Comparative Example 1 | Tricalcium phosphate | — | Omitted | — | 52.7 | 7.86 | 0.2 | 1.02 | 0.79 |
| Comparative | Tricalcium | — | Omitted | — | 25.4 | 2.86 | 0.2 | 0.98 | 0.82 |

TABLE 2-continued

| No. | Fine inorganic particles | Dispersant | Pulverization | Storage conditions | Particle diameter of inorganic suspending agent d95 (μm) | Weight-average (μm) | Content of solid suspending agent during polymerization (μm) | Diameter of polymer beads (μm) | Dispersion index |
|---|---|---|---|---|---|---|---|---|---|
| Example 2 | phosphate | | | 40° C. × 2 weeks | 27.8 | 2.97 | 0.2 | 1.03 | 0.83 |
| Comparative Example 3 | Tricalcium phosphate | — | Conducted | — | 3.15 | 1.13 | 0.1 | 1.27 | 0.64 |
| | | | | 40° C. × 2 weeks | 4.76 | 1.64 | 0.1 | 1.39 | 0.73 |
| Comparative Example 4 | Tricalcium phosphate | — | Conducted | — | 7.83 | 2.47 | 0.1 | 1.70 | 0.76 |
| | | | | 40° C. × 2 weeks | 18.24 | 5.32 | 0.1 | Coagulated | — |
| Comparative Example 5 | Magnesium pyro-phosphate | — | Conducted | — | 7.55 | 2.73 | 0.05 | 1.52 | 0.78 |
| | | | | 40° C. × 2 weeks | 12.57 | 4.82 | 0.05 | Coagulated | — |
| Comparative Example 6 | Magnesium pyro-phosphate | A*1 | Conducted | — | 2.05 | 0.31 | 0.05 | 1.21 | 0.81 |
| | | | | 40° C. × 2 weeks | 2.13 | 0.32 | 0.05 | 1.32 | 0.83 |

*1: Aqueous poly(sodium acrylate) solution having an active-principle content of 40%

The suspending agent-containing slurry of the present invention not only has such an excellent suspending ability in suspension polymerization that it enables the production of vinyl polymer beads having a narrow bead size distribution, but also is capable of retaining this ability over long and of exhibiting the same ability even when it has a high concentration. This suspending agent-containing slurry can be efficiently obtained according to the present invention. By use of this suspending agent-containing slurry, vinyl polymer beads having a narrow bead size distribution can be produced efficiently.

While the invention has been described in detail and with reference to specific embodiments thereof, it will be apparent to one skilled in the art that various changes and modifications can be made therein without departing from the spirit and scope thereof.

What is claimed is:

1. A method of producing a suspending agent-containing slurry for suspension polymerization, comprising:
   pulverizing a particulate inorganic suspending agent in an aqueous medium in the presence of a dispersant to such a degree that said inorganic suspending agent has a particle size distribution in which the particle diameter at weight cumulative 95%, from the minimum particle size, is 1 μm or smaller,
   wherein said particulate inorganic suspending agent is at least one member selected from the group consisting of aluminum hydroxide, ferric hydroxide, titanium hydroxide, phosphates, carbonates and sulfates of calcium, magnesium and barium, talc, kaolin and bentonite, and wherein said dispersant is at least one member selected from the group consisting of an inorganic dispersant (A), a polymeric dispersant (B), and a surfactant (C):
   wherein said inorganic dispersant (A) is an alkali metal salt or ammonium salt or a linear condensed phosphoric acid or a cyclic condensed phosphoric acid;
   wherein said polymeric dispersant (B) contains a hydroxyl group, an amino group, a carboxyl group, a sulfo group or a phosphono group, or an alkali metal or ammonium salt of a carboxyl, sulfo or phosphono group; and
   wherein said surfactant (C) is either a surfactant containing a hydroxyl group, an amide group, a carboxyl group, a sulfo group or a phosphono group, or an alkali metal or ammonium salt of a carboxyl, sulfo or phosphono group, or an ether type surfactant.

2. The method of claim 1, wherein said particulate inorganic suspending agent is selected from the group consisting of talc, kaolin and bentonite.

3. The method of claim 1, wherein said dispersant is (A).

4. The method of claim 1, wherein said dispersant is (B).

5. The method of claim 1, wherein said dispersant is (C).

6. The method of claim 1, wherein said inorganic suspending agent further comprises at least one member selected from the group consisting of aluminum hydroxide, ferric hydroxide, titanium hydroxide, phosphates, and carbonates and sulfates of calcium, magnesium and barium.

7. The method of claim 1, wherein said inorganic suspending agent is tricalcium phosphate or magnesium pyrophosphate.

8. The method of claim 1, wherein
   said inorganic suspending agent is tricalcium phosphate or magnesium pyrophosphate; and
   said dispersant is (A).

9. The method as claimed in claim 1, wherein said dispersant is present in an amount of from 0.01 to 10 parts by weight per 100 parts by weight of said particulate inorganic suspending agent.

10. The method as claimed in claim 1, wherein said particulate inorganic suspending agent comprises tricalcium phosphate or magnesium pyrophosphate.

* * * * *